United States Patent [19]

Kloetzer et al.

[11] Patent Number: 4,927,463
[45] Date of Patent: May 22, 1990

[54] AQUEOUS DISPERSION OF GYPSUM AND ITS USE AS A FILLER AND COATING PIGMENT IN THE PRODUCTION OF PAPER AND CARDBOARD

[75] Inventors: Erhard Kloetzer, Putzbrunn; Johannes Kioustelidis, Ladenburg; Guenter Schmidt, Dannstadt-Schauernheim, all of Fed. Rep. of Germany

[73] Assignee: Biochemie Ladenburg GmbH, Ladenburg, Fed. Rep. of Germany

[21] Appl. No.: 330,815

[22] Filed: Mar. 30, 1989

[30] Foreign Application Priority Data

Apr. 8, 1988 [DE] Fed. Rep. of Germany ....... 3811763

[51] Int. Cl.$^5$ ............ C04B 11/00; C04B 24/00; C01F 11/46
[52] U.S. Cl. .................. 106/109; 106/110; 106/111; 106/461; 106/462; 423/555; 423/267
[58] Field of Search ........... 423/555, 267; 106/109, 106/110, 111, 461, 462, 471

[56] References Cited

U.S. PATENT DOCUMENTS

| | | | |
|---|---|---|---|
| 2,216,207 | 10/1940 | Mewani | 106/110 |
| 3,925,456 | 12/1975 | Pluger et al. | 106/111 |
| 3,941,772 | 3/1976 | Pluger et al. | 106/111 |
| 4,034,086 | 7/1977 | Pluger et al. | 106/111 |
| 4,102,097 | 7/1975 | Fukuba et al. | 106/111 |
| 4,251,436 | 2/1981 | Silberberg et al. | 106/462 |
| 4,260,422 | 4/1981 | Thamor et al. | 106/111 |
| 4,267,108 | 5/1981 | Blum et al. | 106/111 |
| 4,401,473 | 8/1983 | Kleiner et al. | 106/109 |

FOREIGN PATENT DOCUMENTS

| | | | |
|---|---|---|---|
| 2037586 | 2/1972 | Fed. Rep. of Germany | 106/109 |
| 2631031 | 1/1977 | Fed. Rep. of Germany | 106/111 |
| 2851840 | 6/1979 | Fed. Rep. of Germany | 106/111 |
| 3612087 | 10/1986 | Fed. Rep. of Germany | |
| 56-96760 | 8/1981 | Japan | 106/109 |
| 675021 | 7/1979 | U.S.S.R. | 106/111 |
| 2173781 | 10/1986 | United Kingdom | |
| 2179956 | 3/1987 | United Kingdom | |

Primary Examiner—Gary P. Straub
Attorney, Agent, or Firm—Foley & Lardner, Schwartz, Jeffery, Schwaab, Mack, Blumenthal & Evans

[57] ABSTRACT

The present invention provides an aqueous dispersion comprising gypsum and a surface-active, anionic compound, wherein the surface-active compound is a phosphoric acid ester selected from the group consisting of (1) an acidic phosphoric acid ester of the formula:

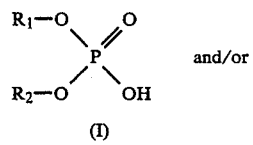

and/or 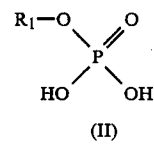

wherein $R_1$ and $R_2$ are the same or different and are alkyl poly(oxyethylene), alkyl poly(oxypropylene), alkylphenoxy- alkyl or alkylphenyl polyoxyalkyl radicals, (2) a monophosphoric acid ester of a mono- or dihydroxyalkylurea or of an alkoxylated mono- or dihydroxyalkylurea, and (3) a monophosphoric acid ester of a polyalkoxylated amine, in which several hydroxyl groups can be esterified with phosphoric acid.

24 Claims, No Drawings

AQUEOUS DISPERSION OF GYPSUM AND ITS USE AS A FILLER AND COATING PIGMENT IN THE PRODUCTION OF PAPER AND CARDBOARD

BACKGROUND OF THE INVENTION

The present invention relates to stabilized aqueous dispersions of gypsum and with the use thereof as filling materials and coating pigments in the production of paper and cardboard.

Aqueous dispersions of finely-divided gypsum ($CaSO_4.2H_2O$), chalk ($CaCO_3$) or kaolin ($Al_2O_3.2SiO_2.2H_2O$) are employed as filling materials and as coating masses in the production of paper and cardboard. However, aqueous dispersions of gypsum have found only limited use since it is difficult to produce slurries with a sufficiently high content of gypsum which simultaneously display a low viscosity and the requisite high stability necessary for further use. For further use in the case of such dispersions, there is normally required a dry material content of 60 to 80% by weight of solids, as well as viscosities of below 300 mPas, and preferably below 200 mPas. It is further required that the dispersions, even after standing for a comparatively long time, form only a small amount of sediment which can be completely redispersed upon stirring, or preferably form no sediment at all.

As gypsum pigment, either finely-ground natural gypsum or a gypsum obtained in the chemical industry as a waste product can be used. Suitable for use is gypsum obtained from the desulfurization of flue gases and from the production of phosphoric acid, lactic acid or citric acid. Because of its high degree of purity and homogeneity, chemical gypsum is of increasing importance.

For use as pigments, these products are dry or wet ground to particle sizes of less than 20 $\mu$m., and preferably to sizes of less than 10 $\mu$m. 50% of these particles must be below 2 $\mu$m., and in many cases it is necessary that 70% be smaller than 2 $\mu$m.

Since aqueous dispersions containing dry material contents of about 70% are solid cakes without further additives, it is necessary to plastify these mixtures by means of additives. For this purpose, it has long been conventional to add dispersion agents such as carboxymethylcellulose, polyacrylates or appropriate anionic, surface-active compounds. It is presumed that these anionic compounds deposit on the surface of the fine pigment particles and, due to their charge, bring about an electrostatic repulsion of the various particles from one another.

In addition, it is typical to add to the slurries low molecular weight organic or inorganic complex formers. Inorganic phosphates such as pyrophosphates, hexametaphosphates or phosphonates are especially preferred.

In addition to the above-mentioned surfaceactive anionic compounds and complexing agents, the slurries may also contain conventional additives such as bactericides, defoaming agents, pH regulators and stabilizers.

In some cases, the stabilization achieved with the dispersion agents alone can be improved with the addition of supplementary stabilizers. Stabilizers such as clays and viscosity-increasing agents such as cellulose ethers, for example carboxymethylcellulose, methylcellulose and hydroxyethylcellulose, have proved to be useful. The said stabilizers are added in an amount of from 0.02 to 0.5, and preferably in an amount of from 0.05 to 0.3% by weight of the slurry.

In many cases, it is advantageous to use impure gypsum in a mixture with chalk or kaolin. By doing so, improved pigment actions can be achieved. The mixture can be produced by adding a dry grinding of one component to an aqueous slurry of the other, or by mixing together two aqueous slurries of the two components.

With all of these slurries it has been a problem to attain a sufficiently high solid material content, and to keep the viscosity low enough so that the products can be worked up satisfactorily and are stable upon storage, i.e. do not form a sediment.

From the Federal Republic of Germany Patent Specification No. 36 12 087, it is known that a surface-active alkylbenzenesulphonic acid, in combination with an inorganic phosphate or an organic amine compound as a complexing agent in an amount of from 0.5 to 2% of the solid material content, can produce a dispersion of gypsum or chalk with a dry material content of 65 to 75%. Viscosities of 140 to about 1000 mPas, measured in a Brookfield viscosimeter, are thereby attained. For many purposes, however, this viscosity is too high. Furthermore, after 24 hours a sediment separates out from these dispersions which cannot be fully redispersed again.

From British Patent Specification No. 2,179,956, it is known to suspend kaolin or chalk in admixture with gypsum and to add starch and polyacrylates as dispersion agents. Besides carboxymethylcellulose (CMC), other dispersion agents which can be added include acidic phosphoric acid esters which are esterified with alkyl, aryl, aralkyl or alkylaryl radicals which contain not more than 10 carbon atoms. However, these relatively thin suspensions containing only 56% of solid material display viscosities of 55 to 160 mPas, and have not proved to be stable since they form sediments.

It has therefore been a problem to find other dispersion agents which, when the solid material concentrations are equal or higher, will provide low viscosities and higher stability. In particular, stabilities of at least 3 weeks and the redispersion of possible sediments are necessary.

Extensive investigations with various wetting agents, dispersion agents, viscosity-regulating materials and the like, either alone or in combination, have provided insufficient improvement over the prior art.

Surprisingly, it has now been found that a small group of surface-active, anionic compounds is especially well-suited for the stabilization of aqueous dispersions of gypsum.

OBJECTS OF THE INVENTION

It is therefore an object of the present invention to provide an aqueous dispersion of gypsum which is suitable for use as a filling material and coating pigment in the production of paper and cardboard.

Another object of the present invention is to provide an aqueous dispersion of gypsum which contains a surface-active, anionic compound.

Still another object is to provide an aqueous dispersion of gypsum which has a low viscosity.

A further object of the present invention is to provide an aqueous dispersion of gypsum which is highly stable even after relatively long periods of time.

Another object is to provide an aqueous dispersion of gypsum which will not form a sediment, or only a small amount of sediment which can be redispersed upon stirring.

A further object is to provide an aqueous dispersion of gypsum which will have a solid material content of at least 60.

SUMMARY OF THE INVENTION

These and other objects are achieved by providing an aqueous dispersion comprising gypsum and a surface-active, anionic compound, wherein said surface-active compound is a phosphoric acid ester selected from the group consisting of (1) an acidic phosphoric acid ester of the formula:

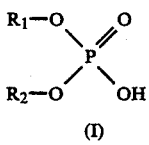 and/or 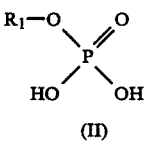

(I) (II)

wherein R1 and R2 are the same or different and are alkyl poly(oxyethylene), alkyl poly(oxypropylene), alkylphenoxyalkyl or alkylphenyl polyoxyalkyl radicals, (2) a monophosphoric acid ester of a monoor dihydroxyalkylurea or of an alkoxylated mono- or dihydroxyalkylurea, and (3) a monophosphoric acid ester of a polyalkoxylated amine, in which several hydroxyl groups can be esterified with phosphoric acid.

As part of the invention a filling material and coating pigment suitable for use in the production of paper and cardboard comprising the aforementioned aqueous dispersion is also provided.

Furthermore, an aqueous dispersion of gypsum can be prepared by:

(a) grinding gypsum to a particle size of less than 20 μm;

(b) mixing said gypsum in an amount of water containing a surface-active anionic compound, the anionic compound being in the form of a phosphoric acid ester;

(c) adjusting the mixture to a pH of about 8 to 10; and (d) dispersing said mixture with rapid stirring.

DETAILED DESCRIPTION OF THE PREFERRED EMBODIMENTS

The dispersions according to the present invention preferably have a solid material content of from about 65 to 80%, with an average particle size of 2 to 10 μm.

In amounts of from 0.1 to 2% and preferably from 0.2 to 1%, especially in the presence of a complexing agent such as an inorganic phosphate like phosphoric acid or polyphosphoric acid, and/or in the presence of polyacrylates or other wetting agents, the compounds of general formula (I) and/or (II) lower the viscosity of aqueous gypsum dispersions with concentrations of from 65 to 75% to values of from about 10 to about 200 mPas. Even after standing for 2 to 3 weeks, viscosities of from about 50 to about 300 mPas are obtained. At the same time, the dispersions remain stable, i.e. display no sedimentation or only a slight sedimentation which can be completely redispersed by stirring. These dispersions therefore remain completely workable.

According to the present invention, the dispersions can contain a calcium complexing agent, preferably present in an amount of from 0.1 to 2%, and more preferably in an amount of from 0.2 to 1%.

Furthermore, the dispersions according to the present invention can also contain a polyacrylate as an additional dispersion agent in a preferred amount of from 0.1 to 2%.

The phosphoric acid esters used according to the present invention contain one or two ester groups which can be the same or different. Bifunctional alcohols can thereby also be attached to two different phosphoric acid residues. The alkylpolyoxyethyl or alkylpolyoxypropyl radicals contain 2 to 30, and preferably 10 to 20 alkoxy groups. The alkyl radicals contain 8 to 24 and preferably 10 to 15 carbon atoms. In the alkylphenyl radicals the alkyl moiety contains 2 to 10 carbon atoms, and the oxyalkyl moieties are preferably oxyethyl, oxypropyl or oxyisopropyl groups or mixtures thereof.

The finely divided gypsum material contained in the dispersions according to the present invention is preferably obtained by dry grinding or by wet grinding in a bead mill. When mixtures of gypsum with chalk or kaolin are to be dispersed, this can be done by mixing aqueous dispersions.

The dispersions according to the present invention can also contain adjuvant or additional materials. These can include conventional dispersion agents such as acrylates, and also conventional complexing agents such as inorganic phosphates, phosphonic acids, citrates, gluconates, organic sulphates or sulphonates. The dispersions can also contain stabilizing agents such as polysaccharides and/or cellulose ethers, which are preferably present in an amount of from 0.02 to 0.5%.

As complexing phosphates, tetrasodium pyrophosphate, sodium hexametaphosphate, trisodium phosphate, sodium hydrogen pyrophosphate and sodium tripolyphosphate have proved to be useful.

As additional stabilizers, those materials are especially preferred which, in low concentrations, form gels which again break up upon the application of low shearing forces; the dispersion thereby stabilizing in a quiescent state and, in the working state, its viscosity not increasing too much. Besides the cellulose ethers, the stabilizers can be carboxymethyl- cellulose, methylcellulose, hydroxyethylcellulose and hydroxypropylcellulose. Other stabilizers also include polysaccharides such as guar, xanthan and carob bean meal, as well as their derivatives, e.g. carboxymethyl or hydroxyalkyl derivatives. To a certain extent, starch, starch derivatives and protein products such as gelatine, peptin and algin can also be used.

The dispersions are normally adjusted to a pH value of 8 to 10. Since this pH value is not automatically obtained with the starting materials, there can be added an appropriate amount of aqueous sodium hydroxide solution, aqueous potassium hydroxide solution, ammonia, sodium carbonate or potassium carbonate. In the case of alkalization with aqueous solutions of alkali metal hydroxides, a pH value of 9 to 10, and in the case of carbonates a pH value of 8 to 9 has proved to be especially advantageous for the production of stable dispersions.

The properties of the dispersions according to the present invention are explained in more detail in the following experimental examples, without the present invention thereby being limited in any way.

EXAMPLES

100 Parts of finely-divided gypsum from a dry grinding, or 100 parts of finely-divided gypsum from a wet grinding and pressed out to a dry material content of 74% on a filter press, are mixed in an appropriate amount of water with the surface-active anionic compound which is in the form of a phosphoric acid ester. Optionally, there is added a dispersion agent in the form of an acrylate, and possibly a complexing agent in the form of an inorganic phosphate. Also possibly added is an additional stabilizing agent. The mixture is adjusted with sodium hydroxide or sodium carbonate to a pH of 9.5 and dispersed with rapid stirring. (The added adjuvant agents are, in each case, referred to the content of gypsum in weight %).

The particle size of the gypsum pigment is from 1 to 25 μm., 98% being less than 10 μm.

The viscosities of the dispersions obtained are investigated with a Haake rotation viscosimeter ("Viskotester VT 23") at stage 1 (23.1 r.p.m.), test body MV II, after 1 hour and 21 days.

After 21 days, the stability is investigated visually in a glass of 65 mm. height and 60 mm. diameter for water supernatant (W) and with the help of a glass rod without stirring for any sediment (S) which may possibly be present. Sediment in this case refers to a hardened, tough sediment which separates from the dispersion.

After completion of the investigation, the possibility of redispersion (A) is tested by stirring with a glass rod. A + indicates a complete redispersion, while a − indicates the remaining behind of possible sediment.

The results of the experiments are set out in the following Tables:

TABLE 3

Gypsum wet grinding with dispersion agent

| gypsum % | phosphoric acid ester % (1) | poly-acrylate % (3) | viscosity 1 h. | viscosity 14 d. | stability 14 d. W mm | stability 14 d. S mm | A |
|---|---|---|---|---|---|---|---|
| I 71 | 0.5 | 0.4 | 30 | 60 | 2 | <1 | + |
| II 71 | 0.5 | 0.4 | 60 | 80 | 2 | <1 | + |
| III 71 | 0.5 | 0.4 | 160 | 200 | 2 | <1 | + |

I = single passage through stirrer bead mill (particle size less than 2 μm 30%)
II = double passage through stirrer bead mill (particle size less than 2 μm 45%)
III = triple passage through stirrer bead mill (particle size less than 2 μm 55%)

The following abbreviations are used in the above Tables:

(1) Lutensit A-EP: acidic phosphoric acid ester of a fatty alcohol alkoxylate; C13/15-fatty alcohol with 18–20 alkylene oxide groups (ethylene oxide/propylene oxide: 2 1)

(2) average to high molecular weight sodium polyphosphate (3) Lastaron 891 (low molecular weight sodium polyacrylate 40% in water)

(4) dodecylbenzene-sulphonate (Federal Republic of Germany Patent Specification No. 36 12 087)

(5) mixture of mono- and diphosphoric acid esters of lauryl alcohol with 4 ethylene oxide groups (6) after 14 days (7) guar meal (8) pre-pasted acetylated distarch phosphate (9) Relatin 700 58 (sodium carboxymethylcellulose)

TABLE 1

Stability of gypsum dispersions with various additives - gypsum dry ground

| gypsum conc. % | phosphoric acid ester (1) % | added dispersion agent % | added complex former % (2) | added thickener/ wetting agent | viscosity mPas 1 h. | viscosity mPas 21 d. | Stability W mm | Stability S mm | A |
|---|---|---|---|---|---|---|---|---|---|
| 68 | — | 0.7 (3) | 0.1 | — | 668 | | 7 (6) | 5 (6) | − (6) |
| " | — | 0.7 (4) | 0.1 | — | 520 | | 16 (6) | all (6) | − (6) |
| " | — | 0.7 (5) | 0.1 | — | 178 | 950 | 5 | 0 | + |
| " | 0.7 | — | — | — | 104 | 312 | 4 | 0 | + |
| " | 0.7 | — | 0.1 | — | 45 | 134 | 7 | 1 | + |
| " | " | — | 0.1 | 0.1 (7) | 149 | 342 | 1 | 1 | + |
| " | " | — | " | 0.2 (8) | 15 | 270 | 7 | 2 | + |
| " | " | — | " | 0.2 (9) | 163 | 193 | 2 | 0 | + |
| " | " | — | " | 0.2 (10) | 59 | 193 | 8 | 0 | + |
| " | " | — | " | 0.2 (11) | 45 | 267 | 6 | 1 | + |

(10) Prapagen WK (distearyl dimethyl ammonium chloride)

(11) Lutensol AP 10 (alkylphenyl alkoxylate)

TABLE 2

Stability of gypsum dispersions (various phosphoric acid esters and concentrations) - gypsum dry ground

| gypsum concentration % | phosphoric acid ester (1) % | polyacrylate (3) % | complex former (2) % | viscosity after 1 h. mPas | viscosity after 21 d. mPas | stability W mm | stability S mm | A |
|---|---|---|---|---|---|---|---|---|
| 67 | 0.7 | — | — | 140 | 350 | 4 | <1 | + |
| 67 | 0.7 | — | 0.1 | 119 | | 6 | <1 | + |
| 68 | 0.4 | 0.4 | — | 45 | 193 | 8 | <1 | + |
| 72 | 0.9 | — | — | 74 | 223 | 2 | <1 | + |
| 72 | 0.9 | — | 0.1 | 59 | 193 | 3 | <1 | + |
| 75 | 0.9 | — | 0.1 | 208 | 579 | 0 | <1 | + |
| 78 | 0.9 | — | 0.1 | 475 | | 0 | <1 | + |
| 68 | 0.5 (12) | 0.4 | — | 45 | 460 | 6 | <1 | + |
| 68 | 0.8 (13) | 0.4 | — | 35 | | | | |
| 68 | 0.3 (1) + 0.3 (14) | 0.4 | 0.3 | 40 | | | | |
| 68 | 1.0 (15) | 0.4 | — | 80 | | | | |
| 68 | 0.3 (1) + 0.3 (15) | 0.4 | — | 95 | | | | |

(12) Marlowet 5300 (acidic polyglycol ether phosphoric acid ester with about 10 alkylene oxide groups)

(13) monophosphoric acid ester of N,N'-di-(2-hydroxy-ethyl)-urea

(14) monophosphoric acid ester of oleyl-di-(2-hydroxy-ethyl)-amine

(15) monophosphoric acid ester of stearylamine ethoxylate (10 ethylene oxide groups).

What is claimed:

1. An aqueous dispersion comprising gypsum and a surface-active, anionic compound, wherein said surface-active compound is a phosphoric acid ester selected from the group consisting of (1) an acidic phosphoric acid ester of the formula:

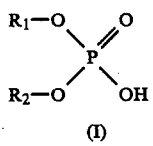 and/or 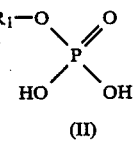

(I) (II)

wherein R1 and R2 are the same or different and are alkyl poly(oxyethylene), alkyl poly(oxypropylene), alkylphenoxyalkyl or alkylphenyl polyoxyalkyl radicals, (2) a monophosphoric acid ester of a monoor dihydroxyalkylurea or of an alkoxylated mono- or dihydroxyalkylurea, and (3) a phosphoric acid ester of a poly-alkoxylated amine, in which one or more hydroxyl groups are are be esterified with phosphoric acid.

2. An aqueous dispersion as claimed in claim 1 wherein said phosphoric acid ester is present in an amount of from 0.1 to 2% by weight of said gypsum.

3. An aqueous dispersion as claimed in claim 2, wherein said phosphoric acid ester is present in an amount of from 0.2 to 1% by weight of said gypsum.

4. An aqueous dispersion as claimed in claim 1, wherein said dispersion has a solid material content of from about 65 to 80%, said solid material having an average particle size of 2 to 10 μm.

5. An aqueous dispersion as claimed in claim 1, further comprising a calcium complexing agent in an amount of from 0.1 to 2% by weight of said gypsum.

6. An aqueous dispersion as claimed in claim 5, wherein said calcium complexing agent is present in an amount of from 0.2 to 1% by weight of said gypsum.

7. An aqueous dispersion as claimed in claim 5, wherein said calcium complexing agent is an inorganic phosphate.

8. An aqueous dispersion as claimed in claim 1, further comprising polyacrylate as an additional dispersing agent in an amount of 0.1 to 2% by weight said gypsum.

9. An aqueous dispersion as claimed in claim 1, further comprising at least one additional stabilizer in an amount of from 0.02 to 0.5% by weight of said gypsum.

10. A filling material and coating pigment suitable for use in the production of paper and cardboard comprising the aqueous dispersion as claimed in claim 1.

11. An aqueous dispersion as claimed in claim 9, wherein said additional stabilizer is selected from the group consisting of cellulose ethers, carboxymethylcellulose, methylcellulose, hydroxyethylcellulose, hydroxypropylcellulose, and polysaccharides.

12. An aqueous dispersion as claimed in claim 11, wherein said polysaccharides are selected from the group consisting of guar, xanthan, and carob bean meal, and their corresponding carboxymethyl and hydroxyalkyl compounds.

13. An aqueous dispersion as claimed in claim 1, further comprising at least one complexing agent selected from the group consisting of inorganic phosphates, phosphoric acids, citrates, gluconates, organic sulphates, and sulphonates.

14. An aqueous dispersion as claimed in claim 13, wherein said inorganic phosphates are selected from the group consisting of tetrasodium pyrophosphate, sodium hexametaphosphate, trisodium phosphate, sodium hydrogen pyrophosphate, and sodium tripolyphosphate.

15. An aqueous dispersion as claimed in claim 1, wherein said aqueous dispersion is adjusted to a pH value of from 8 to 10.

16. An aqueous dispersion as claimed in claim 1, wherein said alkyl polyoxyethyl and alkyl polyoxypropyl radicals contain from 2 to 30 alkoxy groups.

17. An aqueous dispersion as claimed in claim 1, wherein the alkyl groups of said alkyl poly(oxyethylene) and alkyl poly(oxypropylene) radicals contain from 8 to 24 carbon stoms.

18. An aqueous dispersion as claimed in claim 1, wherein the alkyl moiety of said alkylphenyl radicals contain from 2 to 10 carbon atoms.

19. An aqueous dispersion as claimed in claim 1, wherein the oxyalkyl moieties of said alkylphenyl radicals are selected from the group consisting of oxyethyl, oxypropyl, and oxyisopropyl.

20. An aqueous dispersion as claimed in claim 1, wherein said dispersion has a viscosity of from about 10 to about 200 mPas after 1 day, and from about 50 to about 300 mPas after 21 days.

21. An aqueous dispersion as claimed in claim 1, wherein said dispersion does not form a sediment.

22. An aqueous dispersion as claimed in claim 1, wherein said dispersion forms a sediment which can be redispersed upon stirring.

23. A method of preparing an aqueous dispersion of gypsum according to claim 1 comprising the steps of:
(a) grinding gypsum to a particle size of less than 20 μm;
(b) mixing said gypsum in an amount of water containing said surface-active anionic compound;
(c) adjusting the mixture to a pH of about 8 to 10; and
(d) dispersing said mixture with rapid stirring.

24. The method as claimed in claim 23, further comprising the steps of adding a dispersion agent, a complexing agent, and a stabilizing agent to said mixture.

* * * * *